United States Patent
Bottiglieri et al.

[11] Patent Number: 5,412,657
[45] Date of Patent: May 2, 1995

[54] VARIABLE RESOLUTION TIME SLOT INTERCHANGE CIRCUIT

[75] Inventors: Michael P. Bottiglieri, Wyckoff; Stephen J. Brolin, Livingston; Michael A. Miragliotta, Bridgewater; Chandan Sarkar, Wharton, all of N.J.

[73] Assignee: AT&T Corp., Murray Hill, N.J.

[21] Appl. No.: 137,538

[22] Filed: Oct. 18, 1993

[51] Int. Cl.⁶ .................. H04Q 11/08; H04L 12/52
[52] U.S. Cl. ................................ 370/66; 370/68; 370/112
[58] Field of Search .......... 370/58.2, 60, 60.1, 370/66, 68, 84, 58.1, 94.1, 94.2, 110.1, 112, 68.1

[56] References Cited

U.S. PATENT DOCUMENTS

| | | | |
|---|---|---|---|
| H586 | 2/1989 | Kun | 370/94.1 |
| 4,547,877 | 10/1985 | Lehman et al. | 370/84 |
| 4,718,058 | 1/1988 | Van Vuqt | 370/58.1 |
| 4,821,259 | 4/1989 | DeBruler et al. | 370/68.1 |
| 5,014,268 | 5/1991 | Tyrrell et al. | 370/68 |

Primary Examiner—Hassan Kizou
Attorney, Agent, or Firm—Lester H. Birnbaum

[57] ABSTRACT

Disclosed is a circuit which allows an n-bit time slot interchanger (TSI) to process m-bit wide information, where m is some fraction of n. A packing circuit receives the information from the TSI in the form of a series of n-bit segments. The circuit will choose m bits from each segment and produce an n-bit output which includes the m-bit segments in a desired order. The n-bit output can then be looped back to the TSI for insertion into an appropriate time slot.

8 Claims, 3 Drawing Sheets

VARIABLE RESOLUTION TIME SLOT INTERCHANGE CIRCUIT

BACKGROUND OF THE INVENTION

This invention relates to digital loop carrier transmission systems.

Digital loop carriers transmission systems, such as the Subscriber Loop Carrier (SLC ®) transmission system, rely on Time Slot Interchangers (TSIs) to place digital information in appropriate time slots for transmission between customers and a local digital switch. These time slot interchangers usually have a resolution of 8-bits (one byte).

It is also desirable to be able to transmit Integrated Services Digital Network (ISDN) information on the loop carrier system. However, ISDN includes a D-channel which consists of 2-bit packets of information for each customer in addition to the 8-bit packets of channels $B_1$ and $B_2$. A new time slot interchanger which would process both 8-bit and 2-bit packets, or an extra time slot interchanger which processes only 2-bit packets, would be expensive. It would be far more economical to use the standard 8-bit TSI to handle both 8-bit and 2-bit packets.

SUMMARY OF THE INVENTION

The invention is a circuit including a time slot interchanger with n-bit resolution and a packing circuit. The packing circuit includes means for receiving from the time slot interchanger successive n-bit input segments of information including multiples of m bits. The packing circuit further includes means for selecting from each of successive segments a different m-bit packet, and means for assembling each m-bit packet into an n-bit output segment.

BRIEF DESCRIPTION OF THE DRAWING

These and other functions of the invention are delineated in detail in the following description. In the drawing.

DETAILED DESCRIPTION

Figure 1:
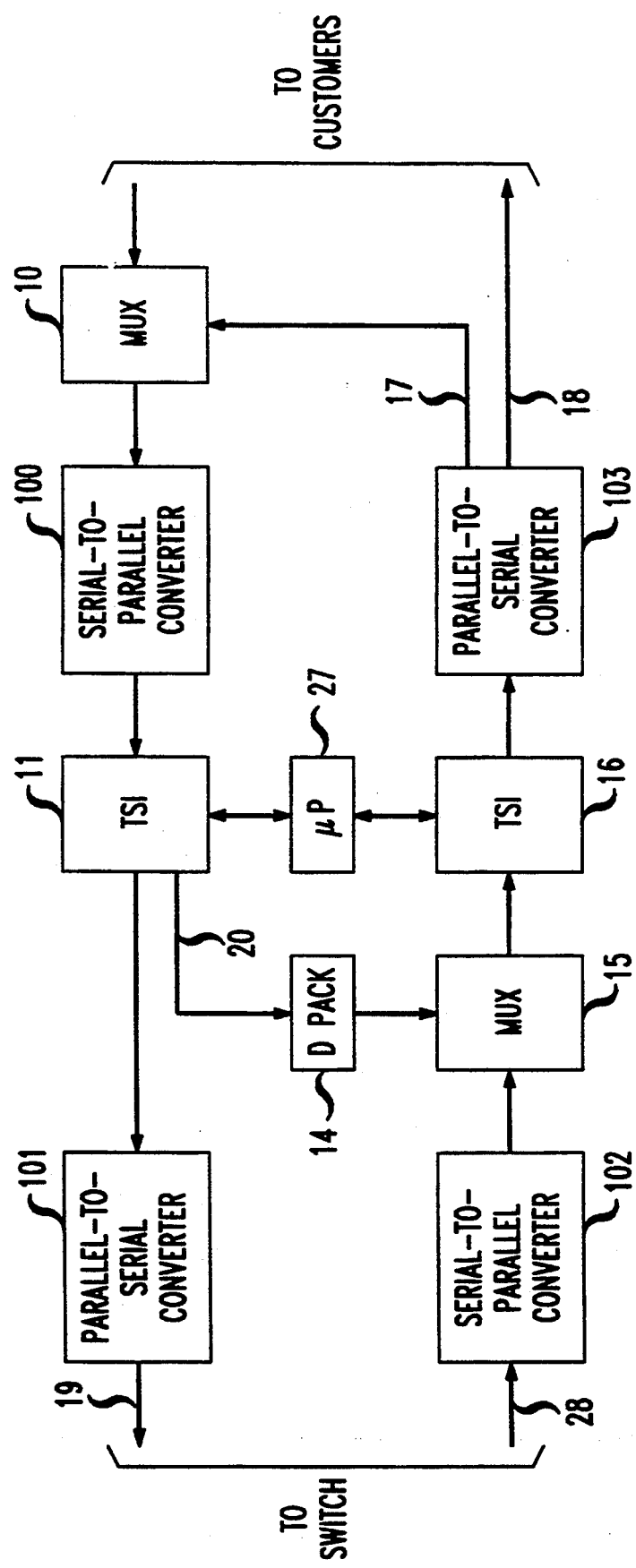
FIG. 1 is a block diagram showing a portion of a digital loop carrier transmission system including the invention in accordance with one embodiment.

FIG. 1 illustrates a portion of a digital loop carrier transmission system which includes the invention. In particular, transmission of digital information is provided from the customers in designated time slots in accordance with well-known techniques to a first multiplexer 10 where the information is combined with other processed information to be described. For example, 32 time slots are usually provided for servicing 24 customers. For ISDN systems, each customer is given a $B_1$ and $B_2$ channel, each consisting of 8-bits, and a D channel consisting of 2-bits. Each time slot typically consists of 16-bits. Thus, two B channels from a single customer can be combined into a single time slot, if desired (see, e.g. U.S. patent application of Brock and Gelfond, Ser. No. 07/892,084, filed Jun. 2, 1992, U.S. Pat. No. 5,291,493), or a single B channel and system information can be placed in each time slot. The D channel information from 8 separate customers are combined in a single time slot.

Figure 2:
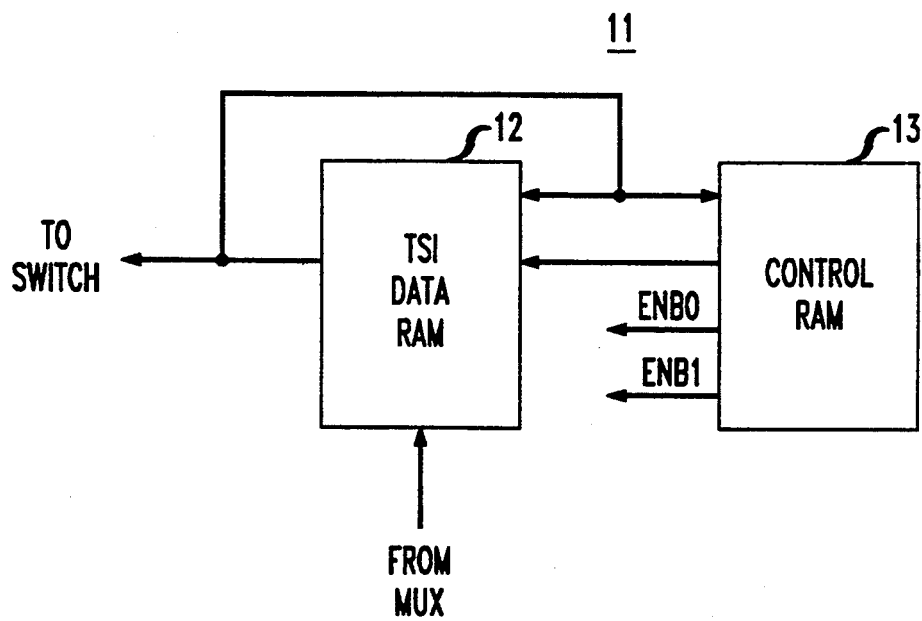
FIG. 2 is a block diagram of a portion of the circuit of FIG. 1.

In order to transmit this information to the local digital switch, the information passes through a serial-to-parallel converter, 100, and is coupled to a first time slot interchanger (TSI), 11, where the time slots are arranged in an appropriate order under the direction of a microprocessor, 27, which receives instructions from the switch. As illustrated in FIG. 2, the TSI basically comprises a Data Random Access Memory (RAM), 12, where the time slot interchanging function is performed under the control of a control RAM 13. The control RAM receives directions from the switch through the microprocessor 27. The control RAM also includes a pair of enabling leads, ENB0 and ENB1, which are coupled to the packing circuit, 14 of FIG. 1, to be described.

A standard TSI has an 8-bit resolution and therefore receives and rearranges 8-bit segments of the digital information. Thus, there is no problem regarding interchanging of the $B_1$ and $B_2$ channels. However, the 2-bit D channel information requires a special TSI if more than one D channel is placed in a time slot for optimum capacity.

In order to permit time slot interchanging of the D channel information, such information is coupled from TSI, 11, to the packing circuit, 14 of FIG. 1, on path 20. To aid in understanding the function of circuit, 14, reference is made to the block diagram of FIG. 4.

The TSI will arrange successive 8-bit segments, A, B, C, D in a desired order as illustrated by block 21. Each 8-bit segment includes four 2-bit packets illustrated by blocks 23, 24, 25 and 26, with each 2-bit packet represented by a lower case letter "a" through "p". It is desired, for example, to produce an 8-bit segment, 22, with the 2-bit packets c-f-l-m, but this cannot be done by the TSI, 11, alone since it cannot resolve less than 8-bit segments.

In order to achieve the desired order, the packing circuit, 14, will select a different 2-bit packet from each of the incoming 8-bit segments. In this example, packet c would be selected from segment A, packet f from segment B, packet l from segment C and packet m from segment D. The selected pieces would be combined and transmitted out of the packing circuit in the order illustrated for block 22.

Figure 3:
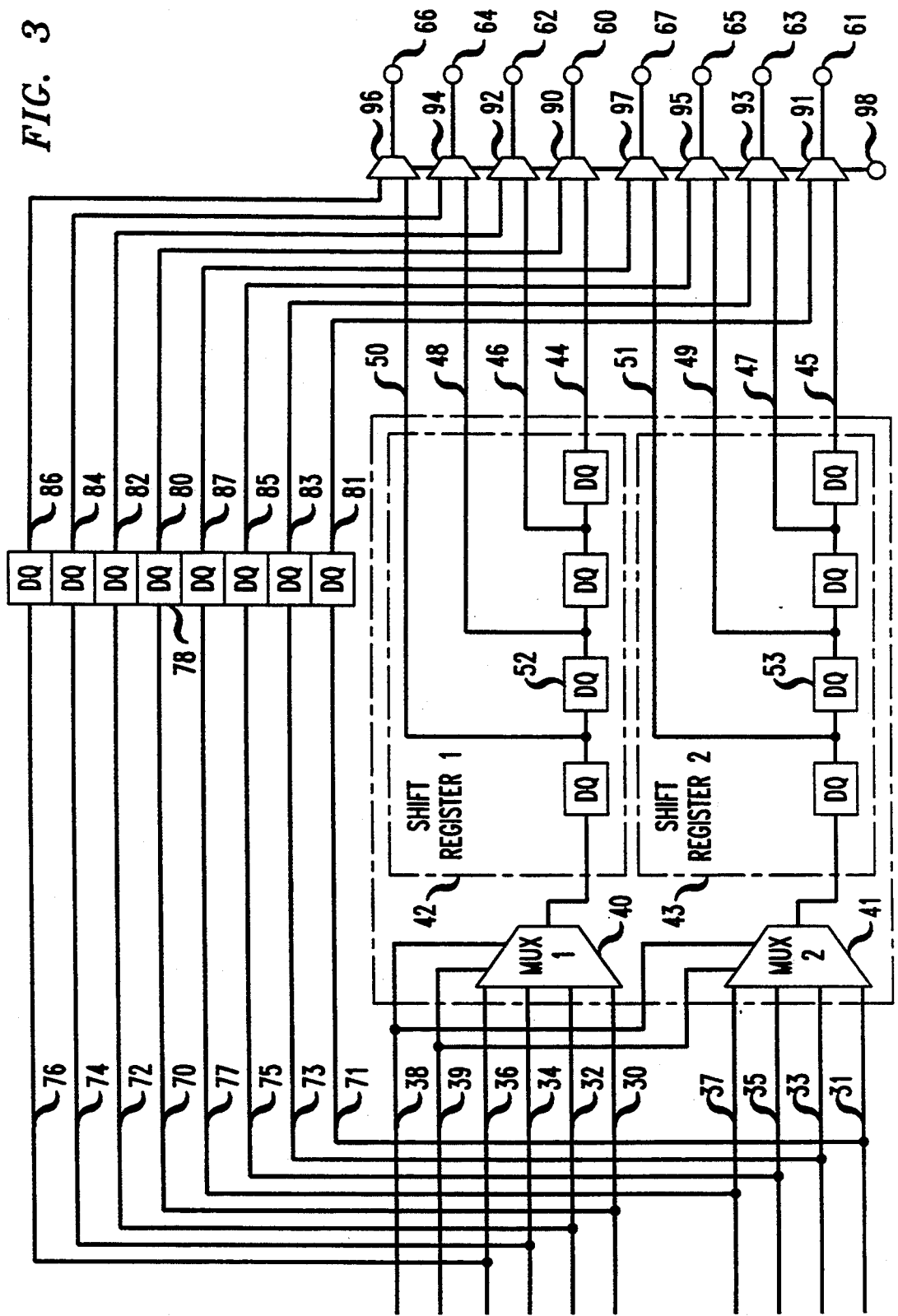
FIG. 3 is a circuit diagram of another portion of the circuit of FIG. 1.

Such an operation on the 2-bit packets can be performed by a circuit such as that shown in FIG. 3 in combination with the TSI 11 of FIG. 1. Each 8-bit segment is received in parallel by the packing circuit on input lines 30–37, with the even bits appearing on lines 30, 32, 34, 36, and the odd bits appearing on lines 31, 33, 35, and 37. The input lines receiving the even bits (30, 32, 34, 36) are coupled to the inputs of a multiplexer 40, while the input leads receiving the odd bits (31, 33, 35, 37) are coupled to the inputs of a multiplexer 41.

Select leads 38 and 39 are electrically coupled to the enable leads ENB0 and ENB1 from the control RAM 13 of TSI 11. These leads are programmable by the microprocessor 27 on a per byte basis. Both leads are coupled to the select inputs of both multiplexers 40 and 41 so as to permit selection of one of four inputs at the output.

The output of multiplexer 40 is coupled to a serial-to-parallel shift register 42, while the output of multiplexer 41 is coupled to another serial-to-parallel shift register 43. The shift registers can comprise standard flip-flop elements, e.g. 52. The parallel output leads (44, 46, 48, 50) of shift register 42 and the parallel output leads (45, 47, 49, 51) of shift register 43 comprise the outputs of the packing circuit which appear at terminals 60–67.

In operation, the 8-bits of each segment will be coupled to respective leads 30–37 at the input of the packing circuit, with the even bits (0, 2, 4, 6) being coupled to multiplexer 40 and the odd bits (1, 3, 5, 7) coupled to multiplexer 41. Only two of these 8-bits, one odd and one even, will be selected based on the signals on the select leads 38 and 39 from the control RAM 13. That is, different combinations of "1s" and "0s" on leads 38 and 39 will select different pairs of odd and even bits to appear at the outputs of multiplexers 40 and 41. For example, a logical "1" on lead 38 and a logical "0" on lead 39 could select the bits from leads 34 and 35 to pass on to shift registers 42 and 43 respectively. These selected bits would be the first 2-bit packet desired at the output (i.e., portion c in FIG. 4). When the next 8-bit segment (B) appears at the input, a logical "0" on lead 38 and a logical "1" on lead 39 could select bits from leads 32 and 33 to pass on to the shift registers. These selected bits would correspond to 2-bit packet f in FIG. 4. In the meantime, the previously selected 2-bits would be shifted one element to the right in the shift registers 42 and 43. A "1" on lead 38 and a "1" on lead 39 could choose the next 2-bit packet from leads 36 and 37 (portion l), and a "0" on lead 38 and a "0" in lead 39 would select the last 2-bit packet (portion m) from leads 30 and 31.

Thus, after the four 8-bit segments (A, B, C, D) are applied to the input leads of the packing circuit, the bits are retained in shift registers 42 and 43 in the desired order. The re-organized bit pattern is then read out of the circuit in parallel on output leads 44–51, with the first selected 2-bits on leads 44 and 45 and terminals 60 and 61, the second selected 2-bits on leads 46 and 47 and terminals 62 and 63, the third selected 2-bits on leads 48 and 49, and terminals 64 and 65 and the fourth selected 2-bits on leads 50 and 51 and terminals 66 and 67. Thus, the bits are now arranged in space in the appropriate order. (When the output passes through parallel-to-serial converter, 103, the bits will be arranged in the appropriate order in time.)

As the 8-bit segments are being fed into multiplexers 40 and 41 for selection of the 2-bit packets, the segments are also coupled to lines 70–77. The bits are then stored in corresponding flip-flop elements, e.g., 78, and coupled by lines 80–87 to corresponding multiplexers 90–97 at the circuit output. Control line, 98, is coupled to each multiplexer 90–97 such that a pulse or absence thereof on the line will determine whether the bits stored in the shift registers appearing on lines 44–50 or the bits appearing on lines 80–87 will be transmitted to the output terminals. In this manner, three bytes out of every four input bytes can be regained by looping them back to the customers at the expense of one packed byte in cases where it is desired to provide customer-to-customer transmission within a remote terminal, e.g., in emergency situations.

Figure 4:
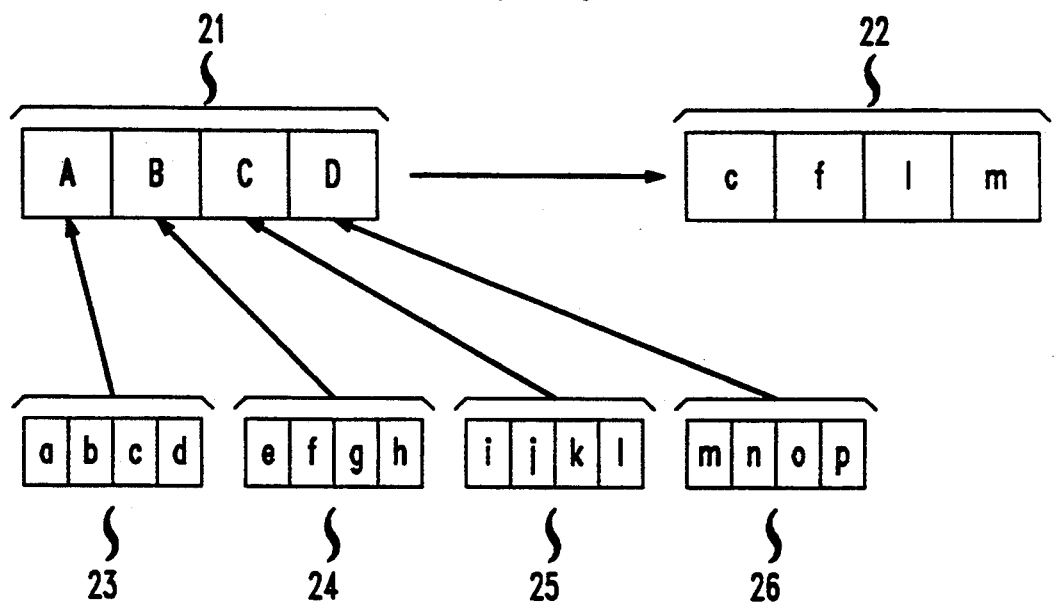
FIG. 4 is a block diagram illustrating the operation of the circuit of FIG. 1.

It should be appreciated that two or more of the four bytes of block 21 in FIG. 4 could be identical. For example, if the 2-bit packets which had to be interchanged all happened to reside in a single time slot, but in the wrong order, the single byte including these pieces could be repeated four times by the TSI 11. The packing circuit could then select a different 2-bit packet from each repeated byte in order to get an output with the 2-bit packets in the appropriate order.

The output bytes from circuit 14 are then coupled to multiplexer 15 where they are combined with digital information coming from the switch on path 28 through serial-to-parallel converter 102 (see FIG. 1). The combined information is coupled to TSI 16, which performs the same time slot interchange function for incoming information as TSI 11 performs for outgoing information (minus the selection of the 2-bit packets). The output of TSI 16 passes through parallel-to-serial converter 103. The bytes including the selected 2-bit packets from circuit 14 are placed onto a time slot which gets sent back to multiplexer 10, on path 17, while the remaining bytes get sent to the customers on path 18. The bytes including the selected 2-bit packets (e.g. 22 of FIG. 4) are then combined with other digital information from the customer in multiplexer 10. These bytes are coupled to TSI 11 where the bytes including the selected 2-bit packets are now placed into time slots for transmission through parallel-to-serial converter 101 out to the digital switch on path 19.

Thus, by the combination of circuit 14 and TSI 11, 2-bit packets are arranged in an appropriate order in a byte, and the byte is inserted into the appropriate time slot for transmission to the switch. The same operation is performed for incoming information from the switch on path 28 by diverting the bytes including D-channel information to TSI 11 and circuit 14 via path 17.

It should be appreciated that while the invention has been described in terms of interchanging 2-bit packets using a TSI with 8-bit resolution, it is not so limited. Rather, the invention should be applicable wherever a TSI with n-bit resolution is used to process m-bit wide information and m is some fraction of n.

Various additional modifications will become apparent to those skilled in the art. All such variations which basically rely on the teachings through which the invention has advanced the art are properly considered within the scope of the invention.

We claim:

1. A circuit comprising:
   a time slot interchanger with n-bit resolution where n is an integer; and
   a packing circuit including:
   means for receiving from the time slot interchanger successive n-bit input segments of digital information, each segment including multiples of m-bits where m is an integer which is some fraction of n;
   means for selecting from each of a number of successive segments a different m-bit packet; and
   means for assembling the m-bit packets into an n-bit output segment coupled to an output of the packing circuit.

2. The circuit according to claim 1 further comprising means for coupling the output segment back to the time slot interchanger.

3. The circuit according to claim 1 wherein the means for receiving the segments comprises a separate input lead for each of the n-bits in the segment.

4. The circuit according to claim 3 wherein the means for selecting comprises m multiplexers each coupled to a different set of input leads, and select leads coupled to the multiplexers for choosing a bit from one lead coupled to each multiplexer.

5. The circuit according to claim 4 wherein the select leads are coupled to enable leads from the time slot interchanger.

6. The circuit according to claim 4 wherein the means for assembling comprises a serial-to-parallel shift register coupled to the multiplexers.

7. The circuit according to claim 1 wherein $n=8$ and $m=2$.

8. The circuit according to claim 1 further comprising means for re-producing at the output of the packing circuit a prescribed number of the n-bit input segments as n-bit output segments in addition to the n-bit output segment including the assembled m-bit packets.

* * * * *